(12) United States Patent
Dettinger et al.

(10) Patent No.: US 8,326,852 B2
(45) Date of Patent: Dec. 4, 2012

(54) DETERMINING QUERY ENTITIES FOR AN ABSTRACT DATABASE FROM A PHYSICAL DATABASE TABLE

(75) Inventors: Richard D. Dettinger, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 11/685,296

(22) Filed: Mar. 13, 2007

(65) Prior Publication Data

US 2008/0228800 A1    Sep. 18, 2008

(51) Int. Cl.
   *G06F 17/00* (2006.01)
(52) U.S. Cl. ........................................ 707/758
(58) Field of Classification Search .................. 707/758
    See application file for complete search history.

(56) References Cited

U.S. PATENT DOCUMENTS

| | | | |
|---|---|---|---|
| 5,924,090 A * | 7/1999 | Krellenstein | 707/5 |
| 6,363,377 B1 * | 3/2002 | Kravets et al. | 707/4 |
| 6,519,618 B1 * | 2/2003 | Snyder | 707/104.1 |
| 6,996,558 B2 | 2/2006 | Dettinger et al. | |
| 7,152,060 B2 * | 12/2006 | Borthwick et al. | 707/3 |
| 2002/0078020 A1 * | 6/2002 | Lawton | 707/1 |
| 2003/0208486 A1 * | 11/2003 | Dettinger et al. | 707/6 |
| 2004/0015470 A1 * | 1/2004 | Smith et al. | 707/1 |
| 2004/0205050 A1 * | 10/2004 | Stevens et al. | 707/3 |
| 2004/0215629 A1 * | 10/2004 | Dettinger et al. | 707/100 |
| 2005/0198019 A1 * | 9/2005 | Cunningham et al. | 707/3 |
| 2006/0020580 A1 * | 1/2006 | Dettinger et al. | 707/3 |
| 2007/0112745 A1 * | 5/2007 | Dettinger et al. | 707/4 |

* cited by examiner

*Primary Examiner* — Charles Kim
*Assistant Examiner* — Kurt Mueller
(74) *Attorney, Agent, or Firm* — Patterson & Sheridan LLP

(57) ABSTRACT

Embodiments of the invention provide techniques for determining query entities in physical tables for an abstract database. A query entity may be created to store a particular set of data. The query entity may be defined in terms of the structure of the physical database, such as an SQL statement, used to generate the query entity as needed. The fields included in a given query entities may be determined based on the presence (or absence) of values in the columns of a physical database table. In addition, logical fields having access method which map to the fields included in a query entity may be generated.

24 Claims, 11 Drawing Sheets

| | 310 | 320 | 330 | 340 | 350 | 360 |
|---|---|---|---|---|---|---|
| | PATIENT_ID | TEST_CODE | VIST_NUMBER | TEST_DATE | COMPLETION_DATE | IMAGE |
| 370 | 5001 | T100 | | 2006-01-04 | 2006-03-17 | |
| 372 | 5013 | T100 | | 2006-05-21 | 2006-08-02 | http://XRAY/scan1.jpg |
| 374 | 5032 | T200 | 10234 | | | http://XRAY/scan3.jpg |
| 376 | 5145 | T200 | 42341 | | | |
| 378 | 5001 | T300 | 32456 | 2006-03-11 | | |
| 380 | 5074 | T300 | 43001 | | | |
| 382 | 5296 | T300 | 47632 | 2006-09-20 | | |
| | 5458 | T400 | 52101 | 2006-10-02 | | |
| 384 | ... | ... | ... | ... | ... | ... |
| | 5354 | T8700 | 49011 | 2006-09-28 | | |

FIG. 3

DETERMINING QUERY ENTITIES FOR AN ABSTRACT DATABASE FROM A PHYSICAL DATABASE TABLE

CROSS-REFERENCE TO RELATED APPLICATIONS

This application is related to commonly assigned U.S. Pat. No. 6,996,558, issued Feb. 7, 2006, entitled "Application Portability and Extensibility through Database Schema and Query Abstraction," which is incorporated by reference herein in its entirety.

BACKGROUND OF THE INVENTION

1. Field of the Invention

The invention generally relates to computer database systems. More particularly, the invention relates to techniques for determining query entities for an abstract database from a physical database table.

2. Description of the Related Art

Databases are well known systems for storing, searching, and retrieving information stored in a computer. The most prevalent type of database used today is the relational database, which stores data using a set of tables that may be reorganized and accessed in a number of different ways. Users access information in relational databases using a relational database management system (DBMS).

Each table in a relational database includes a set of one or more columns. Each column typically specifies a name and a data type (e.g., integer, float, string, etc), and may be used to store a common element of data. For example, in a table storing data about patients treated at a hospital, each patient might be referenced using a patient identification number stored in a "patient ID" column. Reading across the rows of such a table would provide data about a particular patient. Tables that share at least one attribute in common are said to be "related." Further, tables without a common attribute may be related through other tables that do share common attributes. A path between two tables is often referred to as a "join," and columns from tables related through a join may be combined to from a new table returned as a set of query results.

A relational database query may specify which columns to retrieve data from, how to join the columns together, and conditions (predicates) that must be satisfied for a particular data item to be included in a query result table. Current relational databases require that queries be composed in complex query languages. Today, the most widely used query language is Structured Query Language (SQL). However, other query languages are also used. A SQL query is composed from one or more clauses set off by a keyword. Well-known SQL keywords include the SELECT, WHERE, FROM, HAVING, ORDER BY, and GROUP BY keywords. Composing a proper SQL query requires that a user understand both the structure and content of the relational database as well as the complex syntax of the SQL query language (or other query language). The complexity of constructing an SQL statement, however, generally makes it difficult for average users to compose queries of a relational database.

Because of this complexity, users often turn to database query applications to assist them in composing queries of a database. One technique for managing the complexity of a relational database, and the SQL query language, is to use database abstraction techniques. Commonly assigned U.S. Pat. No. 6,996,558, entitled "Application Portability and Extensibility through Database Schema and Query Abstraction," discloses techniques for constructing a database abstraction model over an underlying physical database.

U.S. Pat. No. 6,996,558 discloses embodiments of a database abstraction model constructed from logical fields that map to data stored in the underlying physical database. Each logical field defines an access method that specifies a location (i.e., a table and column) in the underlying database from which to retrieve data. Users compose an abstract query by selecting logical fields and specifying conditions. The operators available for composing conditions in an abstract query generally include the same operators available in SQL (e.g., comparison operators such as $=, >, <, >=$, and, $<=$, and logical operators such as AND, OR, and NOT). Data is retrieved from the physical database by generating a resolved query (e.g., an SQL statement) from the abstract query. Because the database abstraction model is tied to neither the syntax nor the semantics of the physical database, additional capabilities may be provided by the database abstraction model without having to modify the underlying database. Thus, the database abstraction model provides a platform for additional enhancements that allow users to compose meaningful queries easily, without having to disturb existing database installations.

In some situations, a user may need to use only a small portion of the data stored in a table and find it difficult to work with the data in the entire table. For example, a medical researcher may desire to review data from patient blood tests stored in a table of a hospital database. However, in practice, the table storing the blood test data will typically store data related to a large variety of medical tests conducted at the hospital, with the blood test data contributing to only a small percentage of the total records of the table. In such a case, a record in the tests table for a blood test may include values only in the relevant columns of the test table, while other columns are set to null. Due to the large number of records which are not useful to the researcher, she may have difficulty in finding and interpreting the needed records and also find that queries of the results data are unacceptably slow to execute.

One solution to this problem is to provide users with narrowly-tailored access to the portion of the data that is relevant to their needs. In the case of data stored in a physical table, a database view may be used to provide this functionality. In the case of a database abstraction model, a query entity may be used. A query entity is an object created by the database abstraction model that is used for storing data, and is typically configured with a particular data structure. For example, a query entity at the logical level labeled "blood tests" may map to the physical level using an SQL statement that generates a table having only records from the test table that are related to blood tests. In turn, a logical field may have an access method that references the "blood tests" query entity. More generally, a query entity provides a data storing object that may be referenced in an abstract query or by other objects of the data abstraction model. Thus, from a user's perspective, a query entity behaves somewhat like a table in a physical database.

A query entity may be defined in terms of the structure of the physical database, such as an SQL statement used to generate the query entity as needed. Conventionally, a query entity may be defined manually by a person who has technical training as well as knowledge of a particular database structure (e.g., a system administrator with knowledge of the example "tests" table). Often, however, there are a large number of columns in a table, with some columns used only with certain groups of records. For example, in the "tests" table discussed above, a blood test record may include only data in only a few of the overall columns of the tests table. In such a case, creating a query entity requires examining each field to determine whether it should be included in the query entity. This process may have to be repeated many times over before a complete set of query entities is defined from even a single table. These problems mean that creating query entities can be a costly and time-consuming process. Further, this process may have to be repeated each time the underlying structure of the database is modified.

Accordingly, there remains a need in the art for techniques for determining query entities for an abstract database from a physical database table.

SUMMARY OF THE INVENTION

Embodiments of the invention include a method of determining, from a physical database table having one or more fields, a set of query entities for a database abstraction model. The method generally includes identifying a selection of an entity field, from the fields of the physical database table, determining a set of unique values stored in the entity field, and identifying a selection of one or more of the unique values from the set of unique values, wherein each selected value identifies a different query entity to be generated. The method also generally includes, for each selected unique value, identifying a selection of one or more additional fields of the database table to include in that query entity, generating a query entity definition used to generate the query entity, and storing the query entity definition as an object of the database abstraction model, where the generated query entity includes database records having the unique value for that query entity and the selected one or more additional fields included in that query entity, and where the database abstraction model logically describes a database that includes the physical table.

Another embodiment of the invention includes a computer-readable storage medium containing a program which, when executed, performs an operation for determining, from a physical database table having one or more fields, a set of query entities for a database abstraction model. The operations generally include identifying a selection of an entity field, from the fields of the physical database table, determining a set of unique values stored in the entity field, and identifying a selection of one or more of the unique values from the set of unique values, wherein each selected value identifies a different query entity to be generated. The operation generally also includes, for each selected unique value, identifying a selection of one or more additional fields of the database table to include in that query entity, generating a query entity definition used to generate the query entity, where the generated query entity includes database records having the unique value for that query entity and the selected one or more additional fields included in that query entity, and storing the query entity definition as an object of the database abstraction model, where the database abstraction model logically describes a database that includes the physical table.

Still another embodiment of the invention includes a system having a processor and a memory containing a program which, when executed by the processor, performs an operation for determining, from a physical database table having one or more fields, a set of query entities for a database abstraction model. The operation may generally include identifying a selection of an entity field, from the fields of the physical database table, determining a set of unique values stored in the entity field; and identifying a selection of one or more of the unique values from the set of unique values, wherein each selected value identifies a different query entity to be generated. The operation may generally further include, for each selected unique value, identifying a selection of one or more additional fields of the database table to include in that query entity, generating a query entity definition used to generate the query entity, where the generated query entity includes database records having the unique value for that query entity and the selected one or more additional fields included in that query entity, and include storing the query entity definition as an object of the database abstraction model, where the database abstraction model logically describes a database that includes the physical table.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 provides a conceptual illustration of a physical database table storing medical test results, according to one embodiment of the invention.

DETAILED DESCRIPTION OF THE PREFERRED EMBODIMENTS

Figure 1:
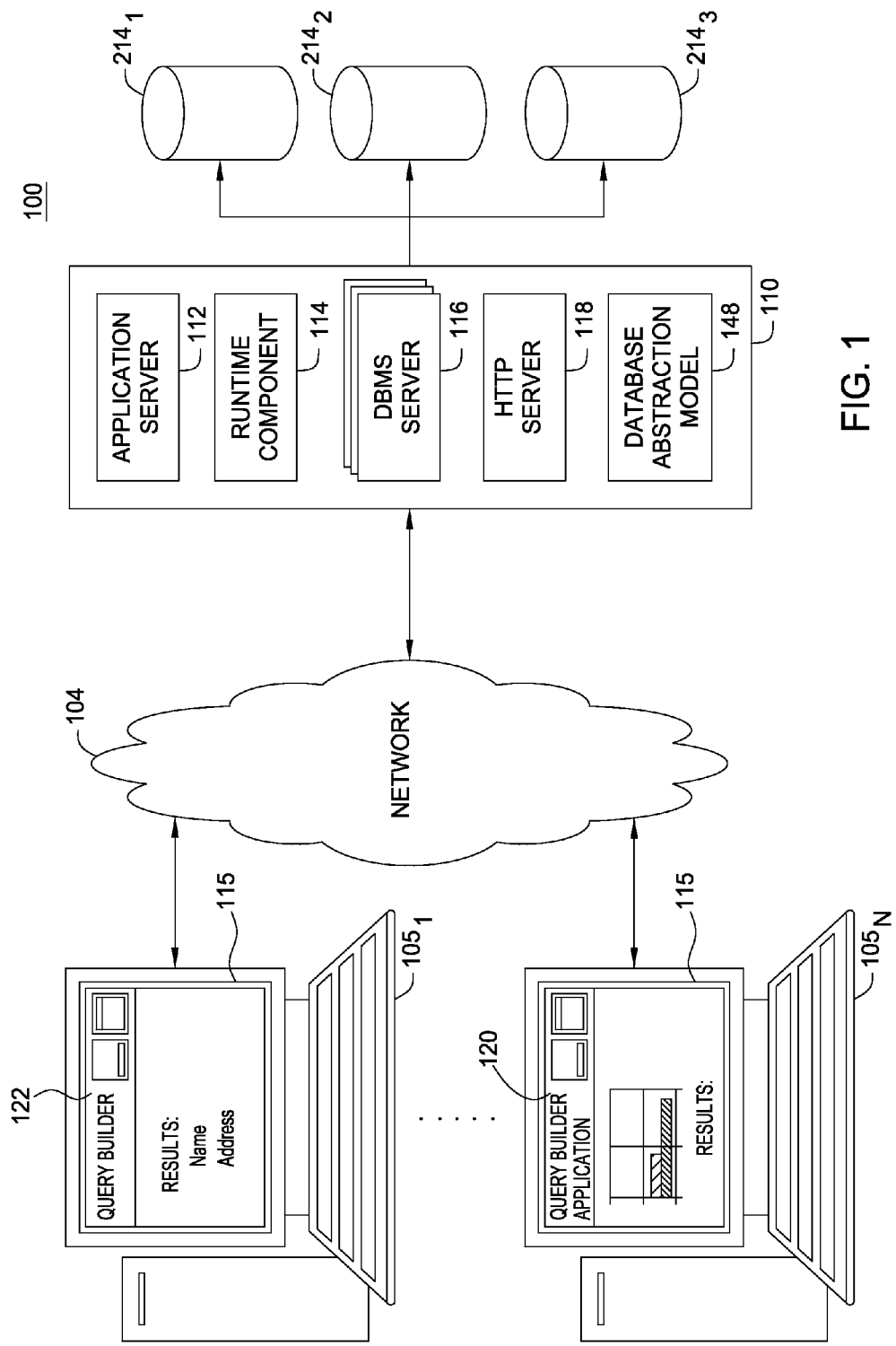
FIG. 1 is a block diagram illustrating a computing and data communications environment, according to one embodiment of the invention.

Embodiments of the invention provide techniques for determining query entities for an abstract database from a physical database table. A query entity may be created to store a particular set of data. As stated, a query entity may be defined in terms of the structure of the physical database, such as an SQL statement used to generate the query entity as needed. In one embodiment, query entities are determined based on the presence (or absence) of values in the columns of a physical database table. In addition, logical fields mapping to the fields included in a query entity may be generated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the network environment 100 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

The Database Abstraction Model: Physical View of the Environment

FIG. 1 illustrates a networked computer system using a client-server configuration. Client computer systems $105_{1-N}$ include an interface that enables network communications with other systems over network 104. The network 104 may be a local area network where both the client system 105 and server system 110 reside in the same general location, or may be network connections between geographically distributed systems, including network connections over the Internet. Client system 105 generally includes a central processing unit (CPU) connected by a bus to memory and storage (not shown). Each client system 105 is typically running an operating system configured to manage interaction between the computer hardware and the higher-level software applications running on the client system 105 (e.g., a Linux® distribution, a version of the Microsoft Windows® operating system IBM's AIX® or OS/400®, FreeBSD, and the like). ("Linux" is a registered trademark of Linus Torvalds in the United States and other countries.)

The server system 110 may include hardware components similar to those used by the client system 105. Accordingly, the server system 110 generally includes a CPU, a memory, and a storage device, coupled by a bus (not shown). The server system 110 is also running an operating system, (e.g., a Linux® distribution, Microsoft Windows®, IBM's OS/400® or AIX®, FreeBSD, and the like).

The environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, users interact with the server system 110 using a graphical user interface (GUI) provided by an interface 115. In a particular embodiment, GUI content may comprise HTML documents (i.e., web-pages) rendered on a client computer system 1051 using web-browser 122. In such an embodiment, the server system 110 includes a Hypertext Transfer Protocol (HTTP) server 118 (e.g., a web server such as the open source Apache web-server program or IBM's WebSphere® program) configured to respond to HTTP requests from the client system 105 and to transmit HTML documents to client system 105. The web-pages themselves may be static documents stored on server system 110 or generated dynamically using application server 112 interacting with web-server 118 to service HTTP requests. Alternatively, client application 120 may comprise a database front-end, or query application program running on client system $105_N$. The web-browser 122 and application 120 may be configured to allow a user to compose an abstract query, and to submit the query to the runtime component 114 for processing.

As illustrated in FIG. 1, server system 110 may further include runtime component 114, DBMS server 116, and database abstraction model 148. In one embodiment, these components may be provided using software applications executing on the server system 110. The DBMS server 116 includes a software application configured to manage databases $214_{1-3}$. That is, the DBMS server 116 communicates with the underlying physical database system, and manages the physical database environment behind the database abstraction model 148. Users interact with the query interface 115 to compose and submit an abstract query to the runtime component 114 for processing. Typically, users compose an abstract query from the logical fields defined by the database abstraction model 148. Logical fields and access methods are described in greater detail below in reference to FIGS. 2A-2B.

In one embodiment, the runtime component 114 may be configured to receive an abstract query, and in response, to generate a "resolved" or "concrete" query that corresponds to the schema of underlying physical databases 214. For example, the runtime component 114 may be configured to generate one or more Structured Query Language (SQL)

queries from an abstract query. The resolved queries generated by runtime component 114 are supplied to DBMS server 116 for execution. Additionally, runtime component 114 may be configured to modify the resolved query with additional restrictions or conditions, based on a focus specified of the abstract query. For example, if an abstract query specified a focus on "patients," then runtime component 114 may be configured to include conditions in the resolved query to limit data devalued or returned to information in the database related to patients.

The Database Abstraction Model: Logical View of the Environment

Figure 2A:
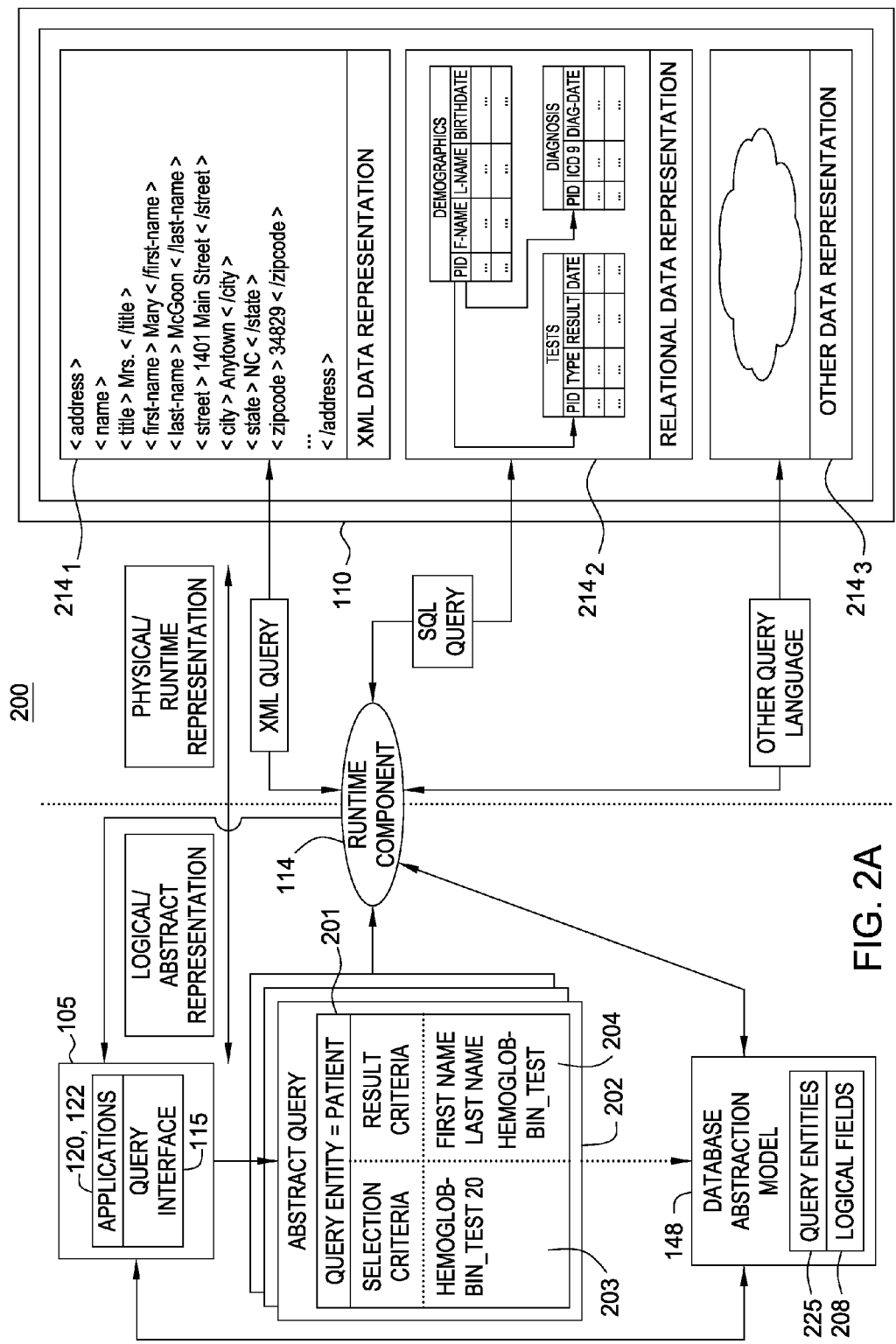
FIG. 2A illustrates a logical view of the database abstraction model constructed over an underlying physical database, according to one embodiment of the invention.

FIG. 2A illustrates a plurality of interrelated components of a database abstraction model, along with relationships between the logical view of data provided by the abstraction model environment (the left side of FIG. 2A), and the underlying physical database mechanisms used to store the data (the right side of FIG. 2A).

In one embodiment, the database abstraction model 148 provides a set of definitions for logical fields 208 and query entities 225. Query entities 225 are objects of database abstraction model 148 that are used for storing data, and are typically configured with a particular data structure. To a user, query entity 225 may function somewhat like a table of a physical database. However, a query entity 225 is not tied to a particular part of the physical database 214. Each query entity 225 may specify a defined set of data, and a set of logical fields 208 may map to a given query entity 225.

In one embodiment, users compose an abstract query 202 using query building interface 115. An abstract query 202 is generally referred to as "abstract" because it is composed using logical fields 208 rather than direct references to data structures in the underlying physical databases 214. The interface 115 may be configured to allow users to compose an abstract query 202 from the logical fields 208. The definition for each logical field 208 in the database abstraction model 148 may identify an access method. The access method may be used to map from the logical view of data exposed to a user interacting with the interface 115 to the physical view of data used by the runtime component 114 to retrieve data from the physical databases 214, including a mapping from the logical field to columns defined for query entity 225. Runtime component 114 retrieves data from the physical database 214 by generating a resolved query from the abstract query 202, according to the access methods 208 for the logical fields included in the query. For example, an access method may include a query contribution used in building a resolved query, such as one or more SQL clauses that reference data objects in the underlying physical database 214 or query entity 225.

Further, depending on the access method specified for a logical field 208, the runtime component 114 may generate a query of many different underlying storage mechanisms. For example, for a given logical field, the runtime component may be generate an XML query that queries data from database $214_1$, an SQL query of relational database $214_2$, or other query composed according to another physical storage mechanism using "other" data representation $214_3$, or combinations thereof (whether currently known or later developed). Particular types of access methods and embodiments for executing abstract queries are further described in commonly assigned U.S. Pat. No. 6,996,558, entitled "Application Portability and Extensibility through Database Schema and Query Abstraction," which is incorporated herein in its entirety.

Figure 2B:
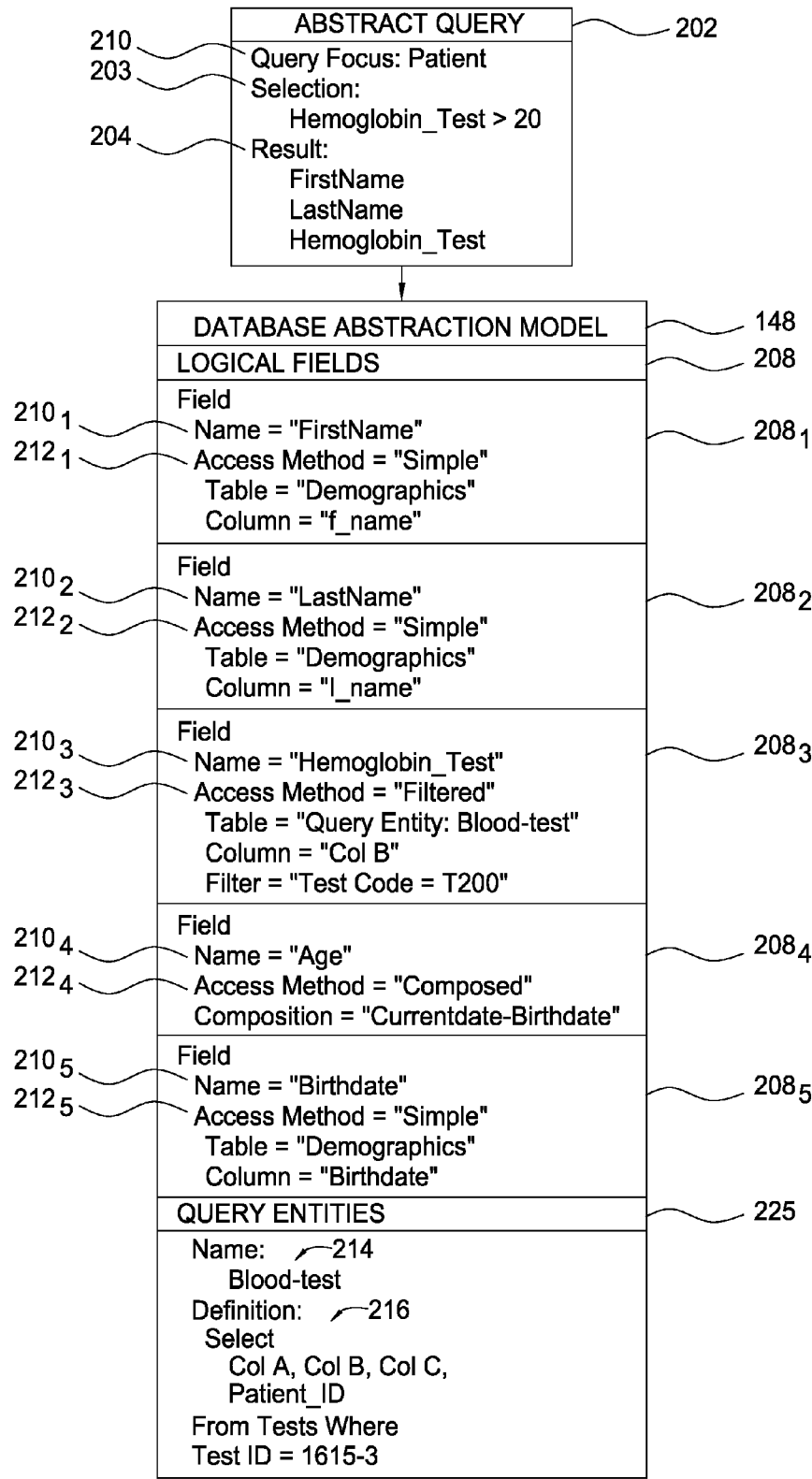
FIG. 2B illustrates an exemplary abstract query and database abstraction model, according to one embodiment of the invention.

FIG. 2B illustrates an example of an abstract query 202, relative to the database abstraction model 148, according to one embodiment of the invention. In this example, the abstract query 202 includes selection criteria 203 indicating that the query should retrieve instances of the "patient" query entity 201 with a "hemoglobin" test value greater than "20." The particular information retrieved using abstract query 202 is specified by result fields 204. In this example, the abstract query 202 retrieves a patient's name and a test result value for a hemoglobin test.

FIG. 2B further illustrates an embodiment of a database abstraction model 148 that includes a plurality of logical field specifications $208_{1-5}$ (five shown by way of example). The access methods included in a given logical field specification 208 (or logical field, for short) provide a mapping for the logical field 208 to tables and columns in an underlying relational database (e.g., database $214_2$ shown in FIG. 2A). As illustrated, each field specification 208 identifies a logical field name $210_{1-5}$ and an associated access method $212_{1-5}$. Depending upon the different types of logical fields, any number of access methods may be supported by the database abstraction model 148. FIG. 2B illustrates access methods for simple fields, filtered fields, and composed fields. Each of these three access methods are described below.

A simple access method specifies a direct mapping to a particular entity in the underlying physical database. Field specifications $208_1$, $208_2$, and $208_5$ each provide a simple access method, $212_1$, $212_2$, and $212_5$, respectively. For a relational database, the simple access method maps a logical field to a specific database table and column. For example, the simple field access method $212_1$ shown in FIG. 2B maps the logical field name $210_1$ "FirstName" to a column named "f_name" in a table named "Demographics."

Logical field specification $208_3$ exemplifies a filtered field access method $212_3$. Filtered access methods identify an associated physical database and provide rules defining a particular subset of items within the underlying database that should be returned for the filtered field. Consider, for example, a relational table storing test results for a plurality of different medical tests. Logical fields corresponding to each different test may be defined, and a filter for each different test is used to associate a specific test with a logical field. For example, logical field $208_3$ illustrates a hypothetical "hemoglobin test." The access method for this filtered field $212_3$ maps to the "T200" column of query entity named "bloodtests" (described further below) and defines a filter "Testcode="T200." Only data that satisfies the filter is returned for this logical field. Accordingly, the filtered field $208_3$ returns a subset of data from a larger set, without the user having to know the specifics of how the data is represented in the underlying physical database, or having to specify the selection criteria as part of the query building process.

Field specification $208_4$ exemplifies a composed access method $212_4$. Composed access methods generate a return value by retrieving data from the underlying physical database and performing operations on the data. In this way, information that does not directly exist in the underlying data representation may be computed and provided to a requesting entity. For example, logical field access method $212_4$ illustrates a composed access method that maps the logical field "age" $208_4$ to another logical field $208_5$ named "birthdate." In turn, the logical field "birthdate" $208_5$ maps to a column in a demographics table of relational database $214_2$. In this example, data for the "age" logical field $208_4$ is computed by retrieving data from the underlying database using the "birthdate" logical field $208_5$, and subtracting a current date value from the birth date value to calculate an age value returned for the logical field $208_4$. Another example includes a "name"

logical field (not shown) composed from the first name and last name logical fields $208_1$ and $208_2$.

By way of example, the field specifications 208 shown in FIG. 2B are representative of logical fields mapped to data represented in the relational data representation $214_2$. However, other instances of the data repository abstraction component 148 or, other logical field specifications, may map to other physical data representations (e.g., databases $214_1$ or $214_3$ illustrated in FIG. 2A). Further, in one embodiment, the database abstraction model 148 is stored on computer system 110 using an XML document that describes the query entities, logical fields, access methods, and additional metadata that, collectively, define the database abstraction model 148 for a particular physical database system. Other storage mechanisms or markup languages, however, are also contemplated.

Data abstraction model 148 includes an example definition for an example query entity 225 which includes a name 214 and a definition 216. As shown, the query entity is named "blood test" and includes a definition in the form of a SQL statement. Specifically, the SQL statement: "SELECT Patient_ID, Col. A, Col. B, Col. C., from Tests where Test_ID=1615-3." In this case, assume the Test_ID value is used to restrict the results in the table to those tests related to blood tests. Thus, this particular query entity includes an ID field (patient ID) and three columns of data related to a blood test. Further, this query entity only includes records from the test table associated with the specified Test_ID. Once defined, logical fields may specify an access method mapping to query entity 225 (whether as part of a simple, composed, filtered, or other access method). For example Field $208_3$ refers to table "QueryEntity:Blood_Test", column B. When such a logical field is included in an abstract query, the runtime component 114 may generate query entity 225 and use it as part of evaluating an abstract query. For example, the runtime component 114 may generate query entity 225 and then execute a resolved query against the records of query entity 225. Alternatively, query entity 225 may be embedded within a resolved query (e.g., as a sub-select statement) generated for an abstract query. Additionally, the SQL statement includes the "Patient_ID" column, to link the table generated using this query entity definition back to the other tables in the physical database. In this case, the Patient ID column serves as a primary key field, used to join data from the query entity definition with data from other parts of a query.

Determining Query Entities in Physical Tables

As stated, a query entity is an object of the database abstraction model that provides access to a portion of data stored in a physical database table. The query entity can function somewhat like a physical table to provide access to a specific set of data. The example described below assumes that a medical researcher needs to analyze database records of certain types of medical tests (in this case, tests named T100, T200, and T300). However, the physical table storing the records associated with the T100, T200, and T300 tests also stores a large number of records for other medical tests, which are of no interest to the researcher. In such a case, a data abstraction model may be configured to create a set of query entities related to the tests table, where each query entity includes a different, possibly overlapping, subset of the records and columns from the tests table.

FIG. 3 provides a conceptual illustration of a physical database table 300 storing medical test data, according to one embodiment of the invention. In this example, table 300 is a physical table named "ALL_TESTS." Table 300 stores a large number of records, with each record storing data related to a specific medical test performed on an individual. Illustratively, table 300 includes a "PATIENT_ID" column 310, a "TEST_CODE" column 320, a "VISIT_NUMBER" column 330, a "TEST_DATE" column 340, a "COMPLETION_DATE" column 350, and an "IMAGE" column 360. "PATIENT_ID" column 310 stores the identification numbers of the patients being tested. "TEST_CODE" column 320 stores an identifier of each type of test conducted. "VISIT_NUMBER" column 330 is an identifier of each unique patient visit at the hospital. "TEST_DATE" column 340 stores the date on which the test was conducted. "COMPLETION_DATE" column 350 stores the date on which the test was completed, and is only used in tests that require multiple days to complete. "IMAGE" column 360 stores the network location of image files created by imaging tests, e.g., X-rays or radiographic scans.

As shown, table 300 includes record 370, which has a PATIENT_ID value of "5001", a TEST_CODE value of "T100," a TEST_DATE value of "2006-01-04," and a COMPLETION_DATE value of "2006-03-17." Thus, record 370 indicates that patient 5001 started test T100 on Jan. 4, 2006, and completed the test on Mar. 17, 2006. Similarly, record 372 indicates that patient 5003 started test T100 on May 21, 2006, and completed the test on Aug. 2, 2006. In this example, the doctor who administers test T100 does not enter a visit number in the medical test database. Thus, records 370, 372 do not include a VISIT_NUMBER value. In addition, test T100 is not an imaging test, and does not result in an image file. Thus, records 370, 372 do not include IMAGE values.

Table 300 also includes a set of records 374, 376 for medical test T200. In this example, test T200 is an X-ray exam which requires ten minutes to complete, and does not require either the test date or completion date to be entered in the medical test database. Thus, records 374, 376 do not include TEST_DATE or COMPLETION_DATE values, but do include IMAGE values of "http://XRAY/scan1.jpg" and "http://XRAY/scan3.jpg," respectively. These IMAGE values are the network locations of image files resulting from the X-ray tests.

Table 300 also includes a set of records 378, 380, 382 for medical test "T300." In this example, test T300 only takes 20 minutes to complete, and is not an imaging test. Thus, records 378, 380, 382 do not include COMPLETION_DATE or IMAGE values. Assume that the in administering test T300, a doctor usually enters the test date in the database, but sometimes fails to do so. Thus, records 378, 382 have TEST_DATE values, but record 380 does not.

Finally, table 300 includes a set of records 384 for all other medical tests conducted at the hospital. The set of records 384 is very large (i.e., thousands of records). Thus, for illustrative purposes, only the first and last records of set of records 384 are shown in FIG. 3. Since in our example the medical researcher is only analyzing records for tests T100, T200, and T300, she is not interested in records 384. Further, each individual test may have a set of columns associated with that test (not shown).

Typically, query entities are created by a database administrator for the benefit of users who require access to a specific set of data records (e.g., the medical researcher). In some cases, there may be a large number of columns in a table, where some columns are only relevant for certain groups of records, as is the case in the example table 300. As a result, administrator may find it difficult to determine which columns should be included in a particular query entity. One approach to simplify this problem is to present the administrator with a summary of the column usage for the records of a query entity. Such a summary may help the administrator to determine which columns are likely to be important for a particular query entity.

Figure 4A:
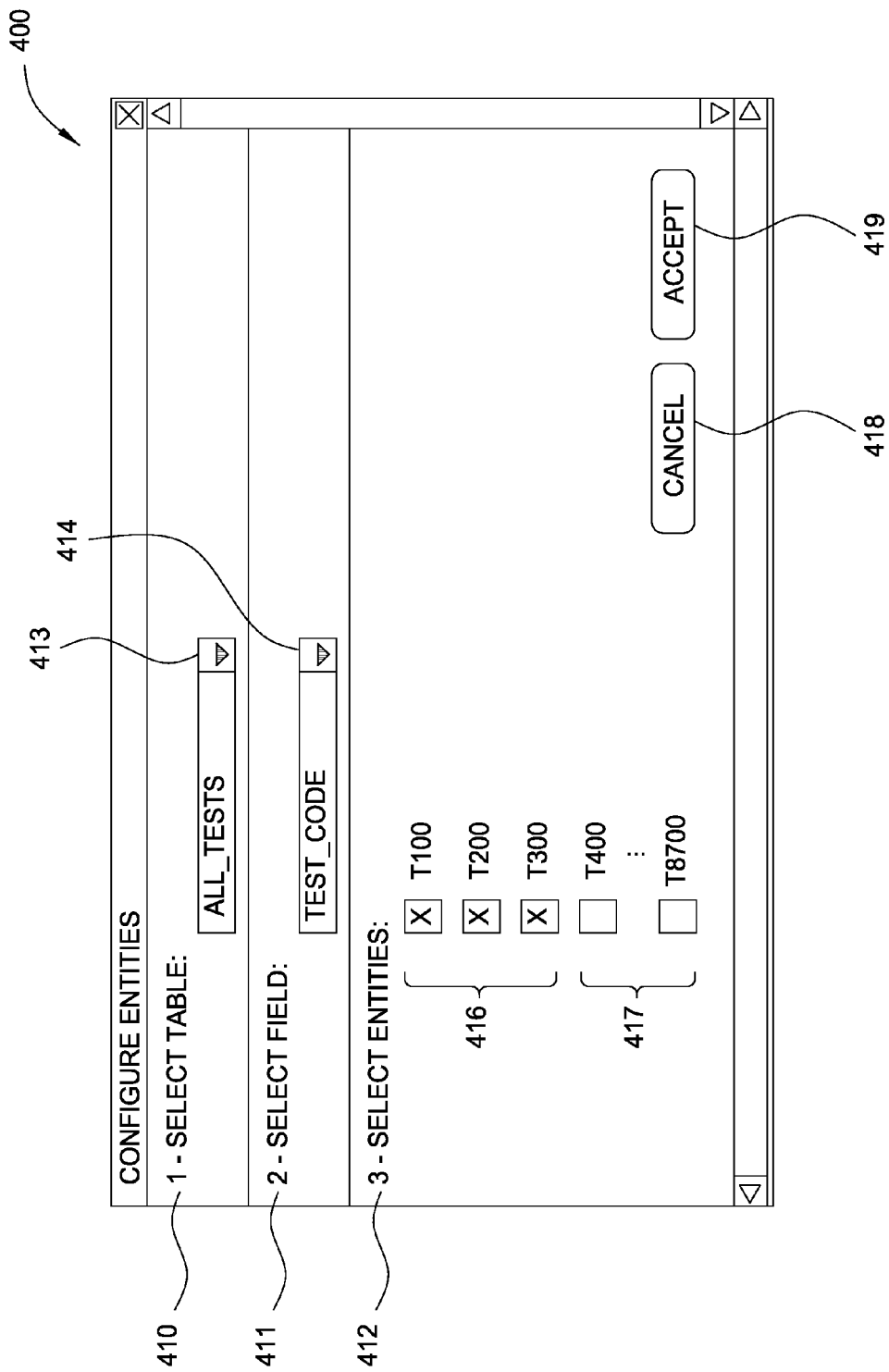
FIGS. 4A-4C provide conceptual illustrations of a screen display of a graphical user interface for defining query entities from physical tables, according to one embodiment of the invention.

In one embodiment, an administrator may create query entities using a graphical user interface (GUI) to specify the parameters which will define the query entities. FIG. 4A illustrates a screen display of a GUI 400 for defining query entities from physical tables, according to one embodiment of the invention. GUI 400 is divided into a set of three sections 410, 411, 412, with each section corresponding to a step in the initial definition of the query entities.

In section 410, a database administrator uses a pull-down menu 413 to select the physical table upon which to base a set of query entities. That is, an administrator may identify a table that includes a set of columns and records to include in a query entity. Illustratively, the administrator has selected the "ALL_TESTS" table in section 410 (i.e., table 300). As a result, a pull-down menu 414 in section 411 is populated with the columns of the "ALL_TESTS" table. The administrator uses pull-down menu 414 to select the column used to identify different query entities. That is, different values in the selected field are used to create different query entities. This field is hereafter referred to as the entity field. In this case, the administrator has selected the "TEST_CODE" field in pull-down menu 414. As a result, the values contained in the "TEST_CODE" field of the "ALL_TESTS" table are listed with checkboxes in section 412. The values listed in section 412 are grouped to eliminate repetitions (i.e., each value is listed only once, even though it may appear many times in the table specified in box pull-down menu 413). The administrator then selects the values that will be used to create the query entities. In this example, the administrator has checkboxes 416 which correspond to tests T100, T200, and T300. A second set of checkboxes 417 correspond to medical tests for which no query entities will be created, and are thus not selected. That is, checkboxes 417 correspond to records 384 shown in FIG. 3, which are of no interest to the researcher. Once sections 410, 411, 412 of GUI 400 are completed, the administrator can either complete the initial definition of the query entities by selecting a "CREATE ENTITIES" button 419, or cancel the initial definition by selection a "CANCEL" button 418.

Figure 4B:
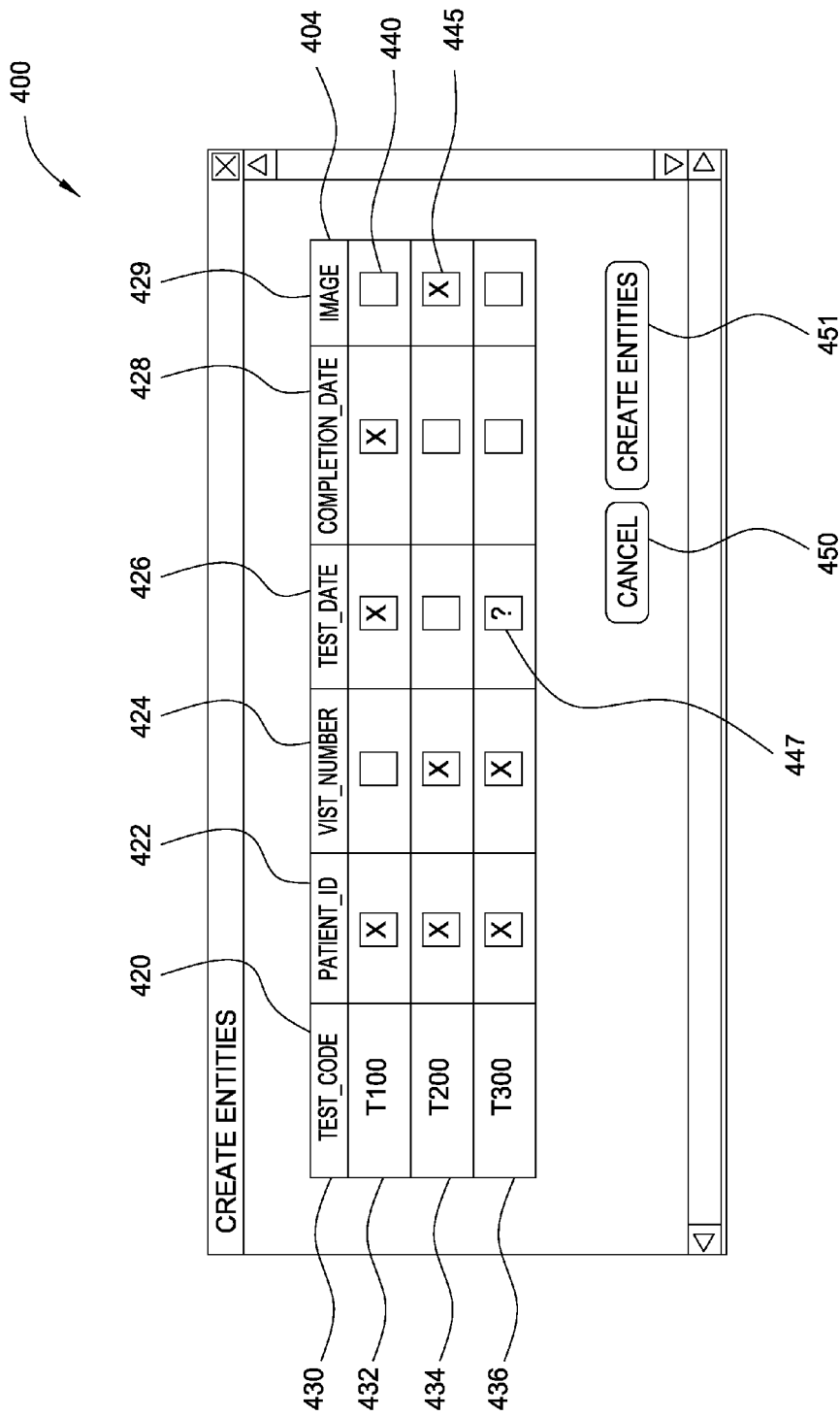

Once the initial definition of query entities is completed, the records of the database matching the entity field(s) are analyzed to determine which other columns store data. That is, for the records that make up a given query entity, the fields other than the entity field are analyzed to determine if they are populated with data values. FIG. 4B illustrates a screen display of a GUI 400 which includes a summary 404 of the analysis of the query entity. Summary 404 provides an overview of which fields are populated in the records corresponding to the entity fields selected by the administrator in FIG. 4A, that is, records with a test code of T100, T200, and T300. As shown, summary 404 includes a title row 430, indicating that summary 404 includes a "TEST_CODE" column 420, a "PATIENT_ID" column 422, a "VISIT_NUMBER" column 424, a "TEST_DATE" column 426, a "COMPLETION_DATE" column 428, and an "IMAGE" column 429.

Summary 404 includes a row 432, which is generated by grouping the records of the physical table that contained TEST_CODE value of T100. Likewise, a row 434 is a grouping of the records having TEST_CODE values of T200, and a row 436 is a grouping of the records having TEST_CODE values of T300. As shown, rows 432, 434, and 436 each include checkboxes in columns 422, 424, 426, 428, and 429. In one embodiment, a "checked" checkbox (i.e., containing an "X") indicates that, for a given query entity, at least one field corresponding to that column is populated with a value. For example, row 434 includes a checked checkbox 445, which indicates that records with a TEST_CODE value of T200 also have a value in the IMAGE field. In contrast, an empty checkbox indicates that none of the records have a value for that field. For example, row 432 includes an empty checkbox 440, indicating that none of the records with a TEST_CODE value of T100 have values stored in the IMAGE field. A checkbox containing a question mark ("?") indicates that only some of the records have values in the field. For example, row 436 includes a checkbox 447 containing a question mark, indicating that some, but not all, of the records with a TEST_CODE value of T300 have values stored in the TEST_DATE field.

Figure 4C:
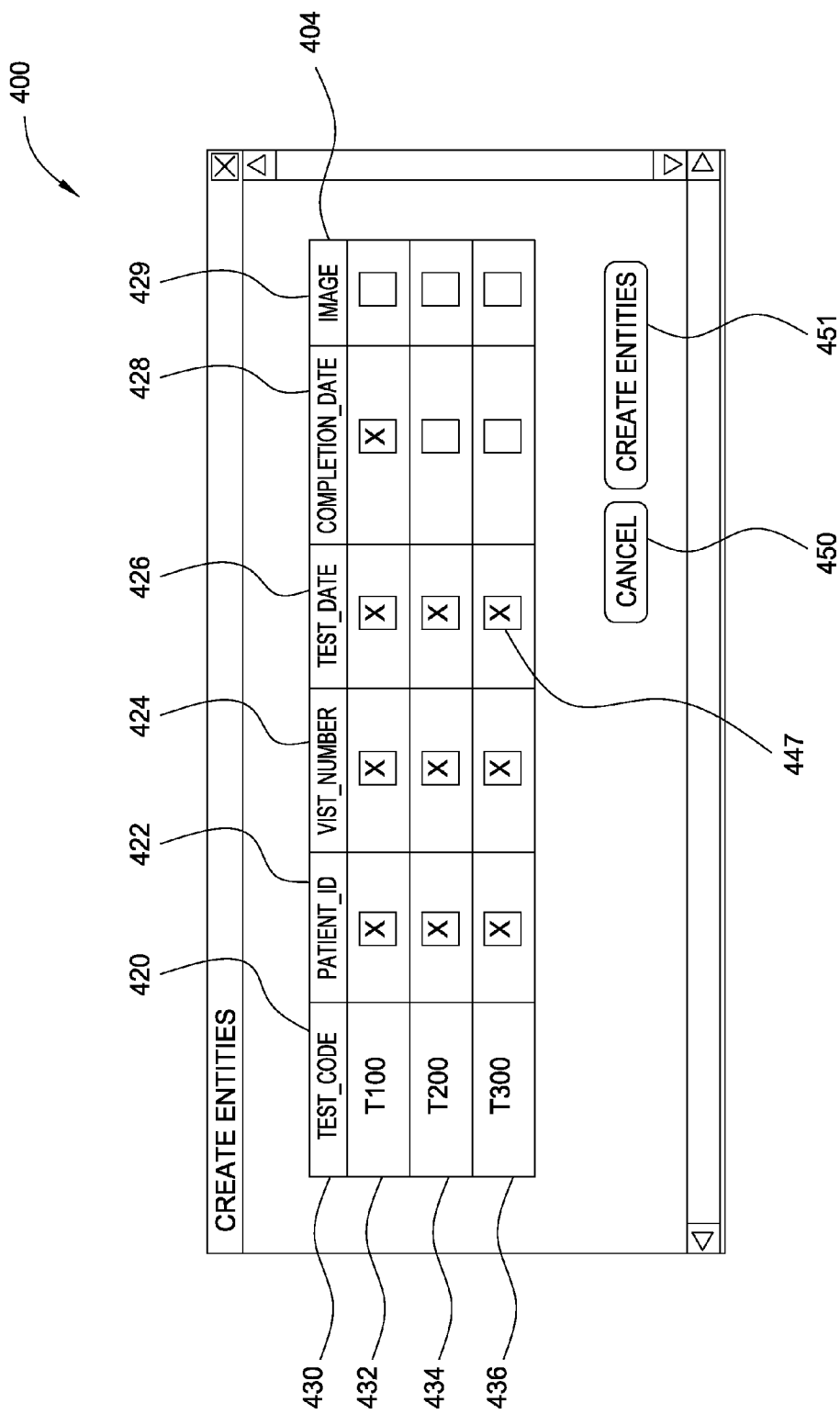

As described, a summary of the field usage for the records of a query entity aids an administrator in deciding which fields are relevant to a query entity. However, the administrator may wish to include fields which are not populated, or may wish to exclude fields which are populated. The included fields form the logical fields of the query entity. In one embodiment, the administrator may interact with the summary to select or de-select fields included in a query entity. FIG. 4C illustrates a screen display of GUI 400 after an administrator has selected and de-selected fields from summary 404. In this example, the administrator has selected, or checked boxes for, the VISIT_NUMBER column 424 for T100 row 432, as well as the TEST_DATE column 426 for T200 row 434. In addition, the administrator has changed checkbox 447 from a question mark to an "X." Finally, the IMAGE column 429 for T200 row 434 has been de-selected. The results of these changes to summary 404 are illustrated in FIGS. 5A-5C.

Additionally, one of ordinary skill in the art will recognize that the techniques for creating a query entity for a given database table described above may also be performed programmatically by the data abstraction model. For example, the administrator may select a given table of the underlying database and invoke a query entity creation tool configured to generate a set of query entities based on the structure and content of the given table. In such a case, the query entity creation tool may be configured to determine a set of different values in a key field (e.g., identify the different test types in a test ID field) and to determine which set of columns store actual data for each different test type. From this information, a query entity definition (e.g., the query entity definition 225 of FIG. 2B) may be generated for each of the different test types. The definition may be an SQL query that creates a table which includes records related to a given test type and the relevant columns for that test type.

Figure 5A:
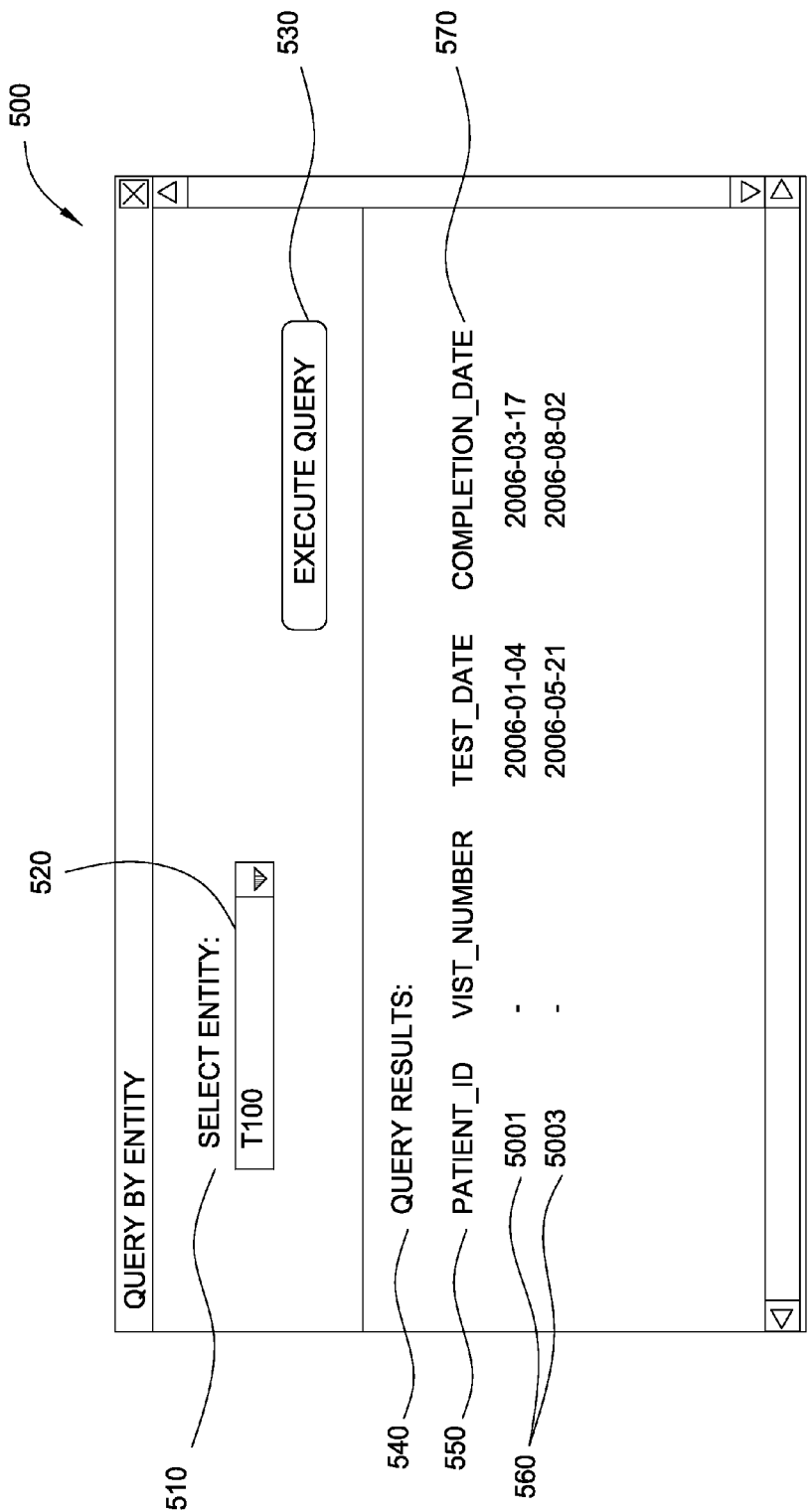
FIGS. 5A-5C provide conceptual illustrations of a screen display of a query interface, according to one embodiment of the invention.
Figure 5B:
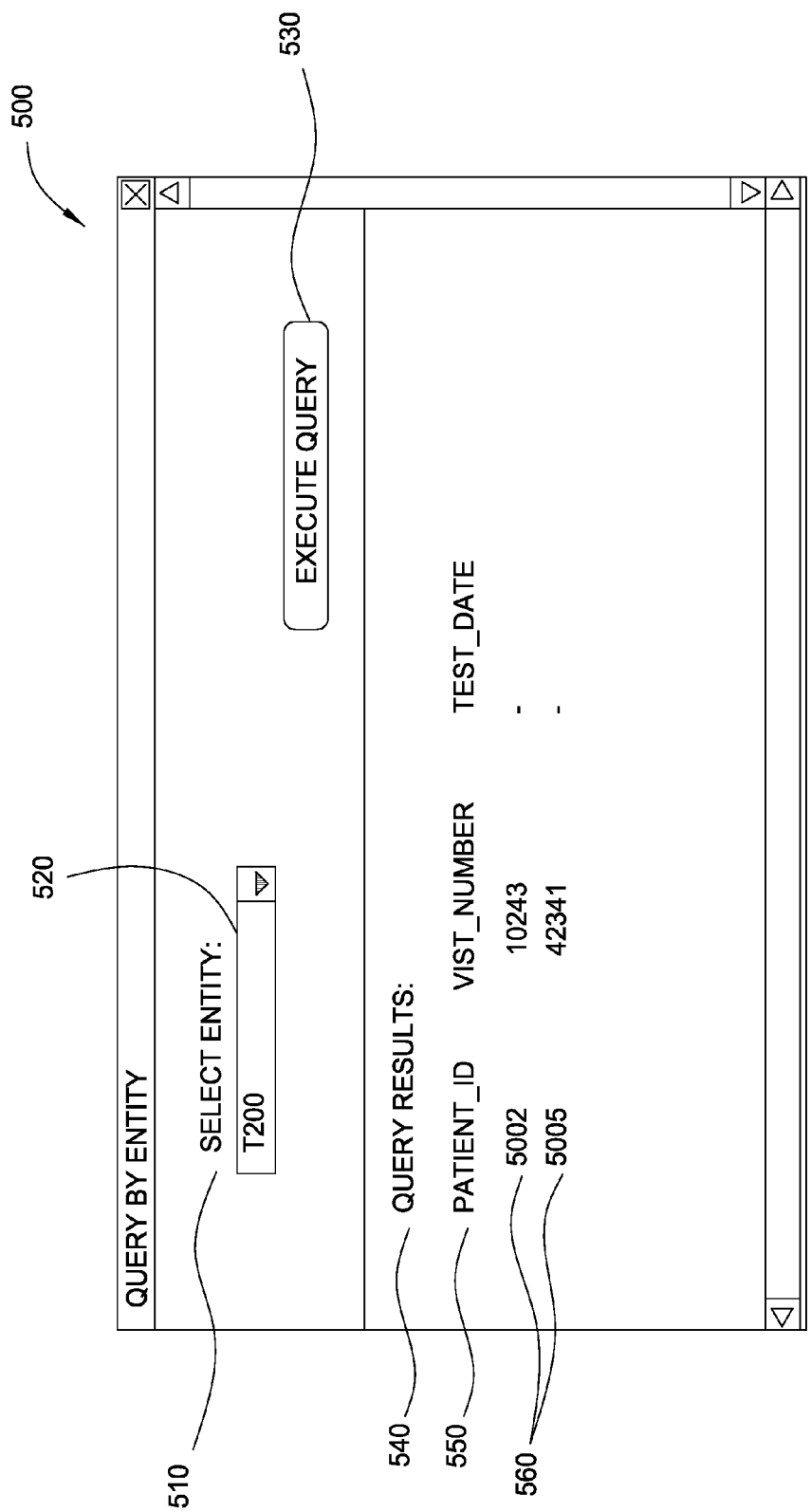
Figure 5C:
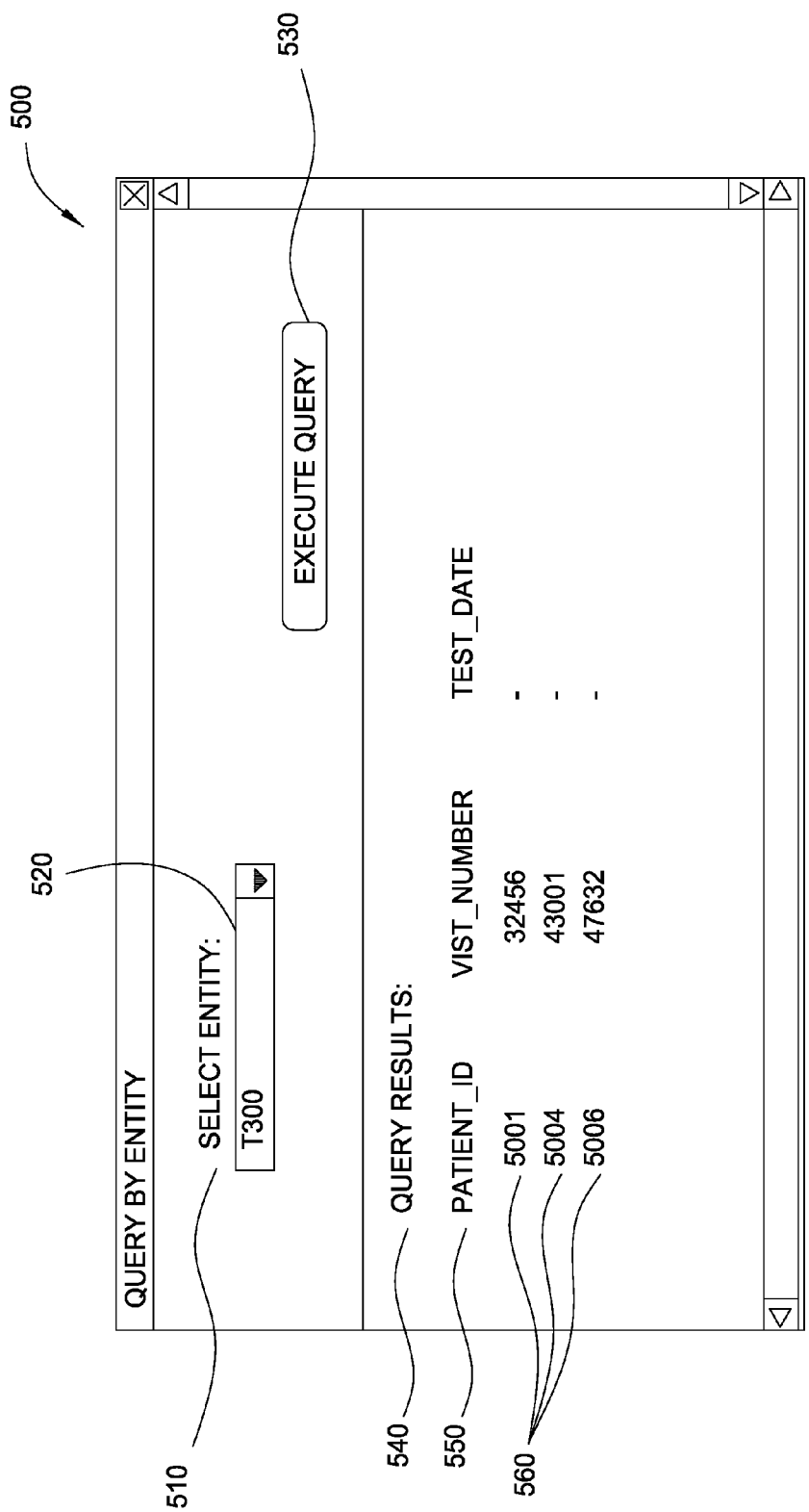

FIGS. 5A-5C provide conceptual illustrations of a screen display of a query interface 500, according to one embodiment of the invention. FIG. 5A illustrates query interface 500, which includes a query definition section 510 and a query results section 540. Query definition section 510 includes a pull-down menu 520, which is used to specify the query entity to be queried. In this example, a user has selected query entity T100, and has then selected a "EXECUTE QUERY" button 530 to perform the query. Query results section 540 presents the results of the query for query entity T100, including a header row 550, and a set of result rows 560, 562. Similarly, FIGS. 5B and 5C illustrate query interface 500 with the selection of query entities "T200" and "T300." As shown in FIGS. 5A-5C, each instance of header row 550 includes the names of the fields selected in summary 404. This is due to each query entity only including those fields specified by the administrator in summary 404. For instance, as shown in FIG. 5A, query entity T100 includes a "COMPLETION_DATE" field 570. In contrast, as shown in FIGS. 5B-5C, query entities T200 and T300 do not include a "COMPLETION_DATE" field. FIGS. 5B-5C illustrate how a user, may select individual columns from different entities T100, T300, etc and mix and match 0 or more query entities with 1 or more columns from each query entities as part of a full query (e.g., the user might query other objects in the system, and not be concerned with these entities).

In the example illustrated in FIGS. 5A-5C, query interface 500 is configured to retrieve data for the query entity specified in pull-down menu 520. However, as stated, an abstract query may include a logical field with an access method that references one or more query entities.

Figure 6:
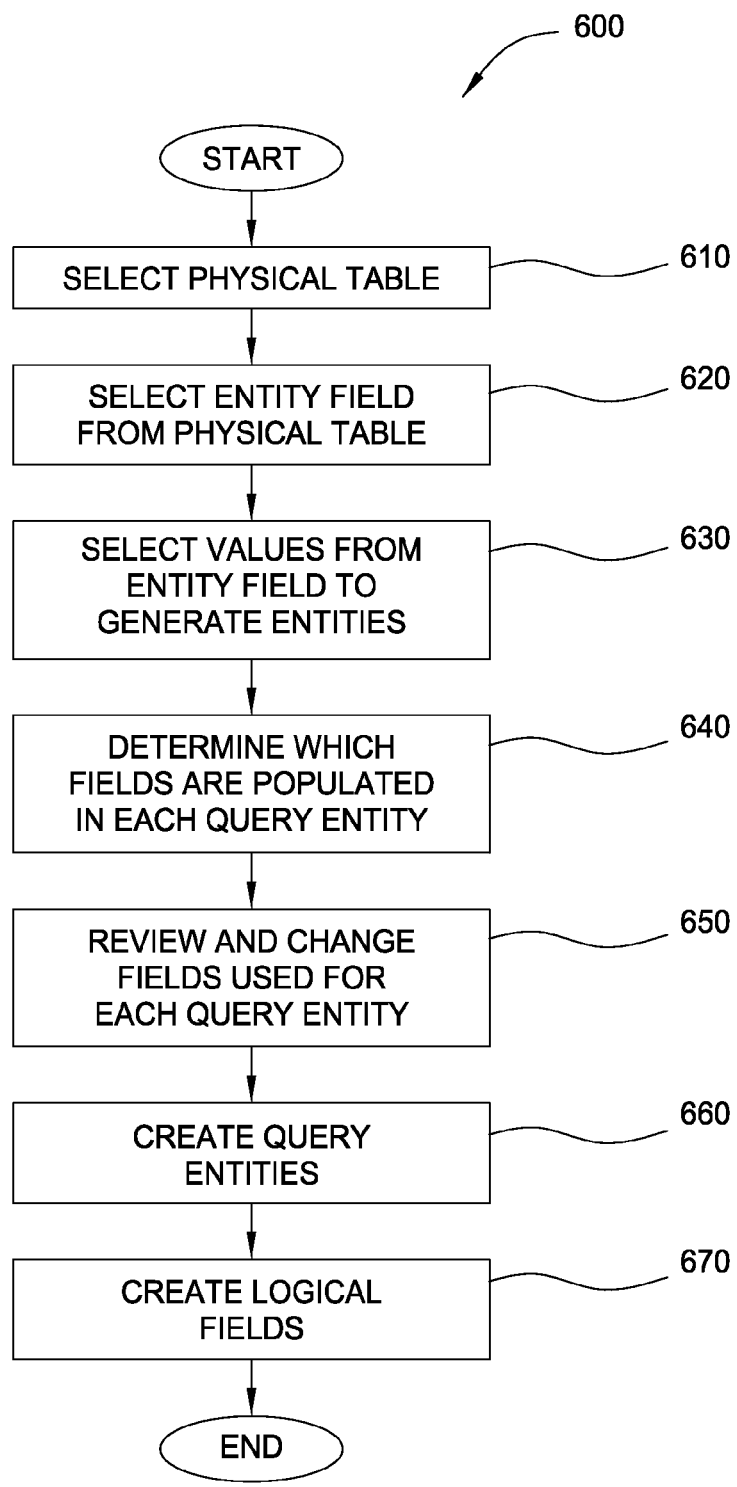
FIG. 6 illustrates a method of determining query entities from physical tables, according to one embodiment of the invention.

FIG. 6 illustrates a method 600 for determining a set of query entities from physical tables, according to one embodiment of the invention. The method 600 begins at step 610, where a physical database table may be selected. In one embodiment, a user selects a table containing records to group into different query entities. In the example of FIG. 4A, this step is shown being performed by selecting pull-down menu 413 of section 410. At step 620, the entity field is selected (e.g., using pull-down menu 414 of section 411). The entity field contains the values used to determine what query entities may be created for the selected database table as well as to determine which query entity a given record belongs. At step 630, values from the entity column are selected. In one embodiment, a user may specify which query entities to create by selecting specific elements from the entity column (e.g., the selections of the T100, T200, and T300 values from the test_code column shown in FIG. 4A). In such a case, each selected value from the entity field is used to create a separate query entity. In another embodiment, runtime component 114 may parse the selected column and determine what different values are present therein and generate a different query entity for each one.

At step 640, the columns to include in each query entity are determined. More specifically, for the records that make up a given query entity, the fields other than the entity field are analyzed to determine if they are populated with values. If they are populated, the fields are assumed to be candidates for inclusion in a query entity. At step 650, an administrator may edit which are included in the query entities being created. If required, the administrator may add or subtract fields included in a query entity. In one embodiment, steps 640 and 650 may be performed by an administrator interacting with a graphical user interface, such as the GUI 400 illustrated in FIGS. 4B-4C. Alternatively, the runtime component may identify which columns store data values for a given entity field value and create a query entity using such columns. At step 660, the query entities are created in the database abstraction model. As described the query entity definition stored in the database abstraction model may specify an SQL query used to generate a table having the records associated with the query entity and the columns related thereto.

At step 670, logical fields mapping to the columns of the query entity are created in the database abstraction model. For example, using the T200 query entity as an example, logical fields may be generated that map to data in the image column of the T200 query entity, or that are used as a condition in an abstract query (e.g., a logical field "T200 Visit ID" could include an access method that maps to the "Visit Number" column of the T200 Query entity.

Embodiments of the invention have been described herein in terms of records in one database table. Of course, one of skill in the art will recognize that tables in one or more databases can be joined. Thus, it is contemplated that query entities may be generated using data from multiple tables, which themselves may be stored in multiple databases.

Conclusion

As described, embodiments of the invention provide techniques for determining query entities for an abstract database from a physical table. In one embodiment, query entities are determined from the values stored in a particular field of the physical table. In addition, fields included in the query entities are determined from other fields of the physical table. Query entities may thus be created quickly and efficiently.

While the foregoing is directed to embodiments of the present invention, other and further embodiments of the invention may be devised without departing from the basic scope thereof, and the scope thereof is determined by the claims that follow.

What is claimed is:

1. A computer-implemented method of determining, from a physical database table having one or more fields and stored in a physical database, a set of query entities for a database abstraction model, comprising:
    identifying, from actual fields of the physical database table, a selection of an entity field containing a plurality of values,
    determining a plurality of unique values within the plurality of values for presentation to a user,
    identifying a user selection of one or more of the unique values from the plurality of unique values
    generating, by operation of one or more computer processors, one or more query entity definitions based on the selected one or more unique values, comprising, for each selected unique value:
        determining one or more fields of the physical database table for which a plurality of records containing the selected unique value have data values, wherein records in the plurality of records do not have data values for at least one other field of the physical database table,
        programmatically populating, in a user interface, the determined one or more fields of the physical database table, wherein the user interface includes an indication, for each of the at least one other fields, that the records in the plurality of records do not have data values for the respective other field,
        receiving, from the user interface, a user selection of one or more additional fields selected from the at least one other field of the physical database table to include in the respective query entity definition, and
        receiving, from the user interface, a user confirmation to create a query entity definition whereby the query entity definition for the selected unique value is generated and contains the determined one or more fields and the selected additional fields, and
    storing the generated one or more query entity definitions as one or more objects of the database abstraction model, wherein the database abstraction model logically describes the physical database that includes the physical database table.

2. The method of claim 1, wherein the query entity definition is an SQL statement used to generate a database table having the entity field, the determined one or more fields of the physical database table, and the selected one or more other fields of the physical database table.

3. The method of claim 1, wherein the query entity definition further includes an identification field used to link the entity query definition to other physical database tables in the physical database.

4. The method of claim 1, further comprising, generating a logical field having an access method mapping the logical field to one of the selected additional fields of one of the query entity definitions.

5. The method of claim 4, wherein the access method is one of a simple, filtered and composed access method type.

6. The method of claim 1, wherein the user interface is configured to allow removal of fields from the query entity definition.

7. The method of claim 6, further comprising:
receiving a request to access a given query entity definition of the one or more query entity definitions;
retrieving the given query entity definition stored in the data abstraction model;
executing the query entity definition; and
presenting a display of data records returned for the executed query entity definition.

8. A computer-readable storage medium containing a program which, when executed, performs an operation for determining, from a physical database table having one or more fields and stored in a physical database, a set of query entities for a database abstraction model, comprising:
identifying, from actual fields of the physical database table, a selection of an entity field containing a plurality of values,
determining a plurality of unique values within the plurality of values for presentation to a user,
identifying a user selection of one or more of the unique values from the plurality of unique values
generating, by operation of one or more computer processors, one or more query entity definitions based on the selected one or more unique values, comprising, for each selected unique value:
determining one or more fields of the physical database table for which a plurality of records containing the selected unique value have data values, wherein records in the plurality of records do not have data values for at least one other field of the physical database table,
programmatically populating, in a user interface, the determined one or more fields of the physical database table, wherein the user interface includes an indication, for each of the at least one other fields, that the records in the plurality of records do not have data values for the respective other field,
receiving, from the user interface, a user selection of one or more additional fields selected from the at least one other field of the physical database table to include in the respective query entity definition, and
receiving, from the user interface, a user confirmation to create a query entity definition whereby the query entity definition for the selected unique value is generated and contains the determined one or more fields and the selected additional fields, and
storing the generated one or more query entity definitions as one or more objects of the database abstraction model, wherein the database abstraction model logically describes the physical database that includes the physical database table.

9. The computer-implemented method of claim 1, wherein generating one or more query entity definitions further comprises:
providing, in the user interface, an indication for a first field of the physical database table indicating that some, but not all, of the records in the plurality of records have data values for the first field.

10. The computer-readable storage medium of claim 8, wherein the query entity definition is an SQL statement used to generate a database table having the entity field, the determined one or more fields of the physical database table, and the selected one or more other fields of the physical database table.

11. The computer-readable storage medium of claim 8, wherein the query entity definition further includes an identification field used to link the entity query definition to other physical database tables in the physical database.

12. The computer-readable storage medium of claim 8, wherein the operation further comprises, generating a logical field having an access method mapping the logical field to one of the selected additional fields of one of the query entity definitions.

13. The computer-readable storage medium of claim 12, wherein the access method is one of a simple, filtered and composed access method type.

14. The computer-readable storage medium of claim 8, wherein the user interface is configured to allow removal of fields from the query entity definition.

15. The computer-readable storage medium of claim 14, wherein the operation further comprising:
receiving a request to access a given query entity definition of the one or more query entity definitions;
retrieving the given query entity definition stored in the data abstraction model;
executing the query entity definition; and
presenting a display of data records returned for the executed query entity definition.

16. The computer-readable storage medium of claim 8, wherein generating one or more query entity definitions further comprises:
providing, in the user interface, an indication for a first field of the physical database table indicating that some, but not all, of the records in the plurality of records have data values for the first field.

17. A system, comprising:
a processor; and
a memory containing a program which, when executed by the processor, performs an operation for determining, from a physical database table having one or more fields and stored in a physical database, a set of query entities for a database abstraction model, comprising:
identifying, from actual fields of the physical database table, a selection of an entity field containing a plurality of values,
determining a plurality of unique values within the plurality of values for presentation to a user,
identifying a user selection of one or more of the unique values from the plurality of unique values
generating one or more query entity definitions based on the selected one or more unique values, comprising, for each selected unique value:
determining one or more fields of the physical database table for which a plurality of records containing the selected unique value have data values, wherein records in the plurality of records do not have data values for at least one other field of the physical database table,
programmatically populating, in a user interface, the determined one or more fields of the physical database table, wherein the user interface includes an indication, for each of the at least one other fields, that the records in the plurality of records do not have data values for the respective other field,
receiving, from the user interface, a user selection of one or more additional fields selected from the at least one other field of the physical database table to include in the respective query entity definition, and receiving, from the user interface, a user confirmation to create a query entity definition whereby the query entity definition for the selected unique value is generated and contains the determined one or more fields and the selected additional fields, and storing the generated one or more query entity definitions as one or more objects of the database abstraction model, wherein the database abstraction model logically describes the physical database that includes the physical database table.

18. The system of claim 17, wherein the query entity definition is an SQL statement used to generate a database table having the entity field, the determined one or more fields of the physical database table, and the selected one or more other fields of the physical database table.

19. The system of claim 17, wherein the query entity definition further includes an identification field used to link the entity query definition to other physical database tables in the physical database.

20. The system of claim 17, system, wherein the operation further comprises, generating a logical field having an access method mapping the logical field to one of the selected additional fields of one of the query entity definitions.

21. The system of claim 20, wherein the access method is one of a simple, filtered and composed access method type.

22. The system of claim 17, wherein the user interface is configured to allow removal of fields from the query entity definition.

23. The system of claim 22, wherein the operation further comprising:

receiving a request to access a given query entity definition of the one or more query entity definitions;

retrieving the given query entity definition stored in the data abstraction model;

executing the query entity definition; and presenting a display of data records returned for the executed query entity definition.

24. The system of claim 17, wherein generating one or more query entity definitions further comprises:

providing, in the user interface, an indication for a first field of the physical database table indicating that some, but not all, of the records in the plurality of records have data values for the first field.

* * * * *